United States Patent [19]

Berry

[11] Patent Number: 4,831,292
[45] Date of Patent: May 16, 1989

[54] LINEAR MOTOR ARRANGEMENT WITH CENTER OF MASS BALANCING

[75] Inventor: Robert L. Berry, Rancho Palos Verdes, Calif.

[73] Assignee: Hughes Aircraft Company, Los Angeles, Calif.

[21] Appl. No.: 199,979

[22] Filed: May 27, 1988

[51] Int. Cl.$^4$ ............................................. H02K 33/12
[52] U.S. Cl. .................................... 310/15; 310/23; 310/30
[58] Field of Search ................. 310/15, 23, 24, 30

[56] References Cited

U.S. PATENT DOCUMENTS

| 2,861,778 | 11/1958 | Spurlin | 310/23 |
| 4,360,087 | 11/1982 | Curwen | 188/379 |

FOREIGN PATENT DOCUMENTS

| 2742758 | 3/1978 | Fed. Rep. of Germany | 310/23 |
| 143191 | 12/1953 | Sweden | 310/23 |
| 061025B | 5/1978 | U.S.S.R. | 310/23 |

Primary Examiner—Patrick R. Salce
Assistant Examiner—Judson H. Jones
Attorney, Agent, or Firm—Paul M. Coble; A. W. Karambelas

[57] ABSTRACT

A motor winding assembly of mass $M_m$ is disposed for reciprocating linear movement within a housing, while a motor armature assembly of mass $M_a$ is disposed for reciprocating linear movement within the motor winding assembly. A first spring having a spring constant $K_m$ is connected between the motor winding assembly and the housing, and a second spring having a spring constant $K_a$ is connected between the motor armature assembly and the housing. The spring constants $K_m$ and $K_a$ satisfy the relation $K_m/K_a = M_m/M_a$, and since the motor housing assembly and the motor armature assembly move by amounts inversely proportional to their respective masses, essentially no vibration is transmitted to the housing over a wide range of motor operating frequencies.

13 Claims, 1 Drawing Sheet

LINEAR MOTOR ARRANGEMENT WITH CENTER OF MASS BALANCING

TECHNICAL FIELD

This invention relates generally to electric motors, and it more particularly relates to a linear motor arrangement in which minimum vibration is transmitted to the motor housing.

BACKGROUND OF THE INVENTION

In certain applications such as cryogenic refrigerators used to cool electronic instruments or sensors, it is necessary to drive a piston in a reciprocating fashion. This was initially accomplished with a conventional rotary electric motor in which rotary motion from the motor was converted into linear reciprocating motion through a crank mechanism involving connecting rods and bearings. In order to achieve long life, the motor and bearings must be lubricated, typically through the use of some form of grease. In cryogenic refrigerator applications, the type of greases that are suitable must have very low vapor pressure so that they will not contaminate the working fluid of the refrigerator. To date, all of the known greases provide a certain amount of contamination which limits the life of the refrigerator.

A recent advancement in the art which has been used to extend the life of cryogenic refrigerators is the development of linear motors wherein the refrigerator pistons are moved directly by the motors in linear reciprocating fashion. In linear motors there is no need to convert rotary motion into linear motion. Hence, a simpler device results in which the need for conventional rotary bearings and their lubricating greases is eliminated. Instead, slider bearings made from solid plastic films may be employed, thereby eliminating the need for lubricant greases and resulting in a long-life refrigerator in which the major source of contamination of the working fluid has been removed.

When a linear motor is employed to move a piston in reciprocating fashion, the resultant motion of the center of mass of the moving parts creates a vibrational force on the housing or other structure on which the moving parts are mounted, resulting in undesired mechanical vibration of the entire assembly.

One technique which has been used to reduce vibrations in linear motors is to employ a pair of linear motors disposed on a common axis and operated 180° out of phase with one another. However, not only does such an arrangement result in additional cost due to the second motor and its associated control circuitry, but the size and weight of the overall arrangement are excessively large for some applications.

Another vibration reduction technique which has been employed with linear motors involves a dynamic, or Frahm, counterbalancing scheme. In its classical implementation, a Frahm balancer consists of a mass and a spring that connects the mass to the housing in which vibrations are to be reduced. The spring constant and the mass are selected to result in a natural frequency for the spring-mass subsystem that is exactly equal to the natural frequency of vibration of the linear motor. Under this condition, when the spring-mass balancing subsystem is excited at its natural frequency, it will provide a vibrational force in exact opposition to that provided by the motor on the housing. These vibrational forces cancel one another, and no vibration is transmitted to the housing. An example of an improved form of Frahm counterbalancing system is given in U.S. Pat. No. 4,360,087 to Peter Curwen. Although Frahm counterbalancing systems provide good vibration reduction at or very near the particular frequency for which the system was designed, such systems are not effective over wider ranges of frequencies such as are often encountered in practice.

SUMMARY OF THE INVENTION

It is an object of the present invention to provide a balancing arrangement for a linear motor which is not sensitive to motor frequency.

It is a further object of the invention to provide a linear motor arrangement in which essentially no vibration is transmitted to the arrangement housing over a wide range of motor operating frequencies.

It is still another object of the invention to provide an efficient vibration reduction arrangement for a linear motor which is small in size, light in weight, and low in cost.

In a linear motor arrangement according to the invention a motor winding assembly of mass $M_m$ is disposed within a housing such that it may undergo reciprocating linear movement relative to the housing. A motor armature assembly of mass $M_a$ is disposed within the housing adjacent to the motor armature assembly such that it may undergo reciprocating linear movement relative to the motor winding assembly and the housing. A first spring having a spring constant $K_m$ is operatively disposed between the motor winding assembly and the housing, a second spring having a spring constant $K_a$ is operatively disposed between the motor armature assembly and the housing, and a spring effect is also provided between the motor winding assembly and the motor armature assembly. The spring constants $K_m$ and $K_a$ substantially satisfy the relation $K_m/K_a = M_m/M_a$.

Additional objects, advantages, and characteristic features of the present invention will become readily apparent from the following detailed description of a preferred embodiment of the invention when considered in conjunction with the accompanying drawings.

DETAILED DESCRIPTION OF THE INVENTION

Figure 1:
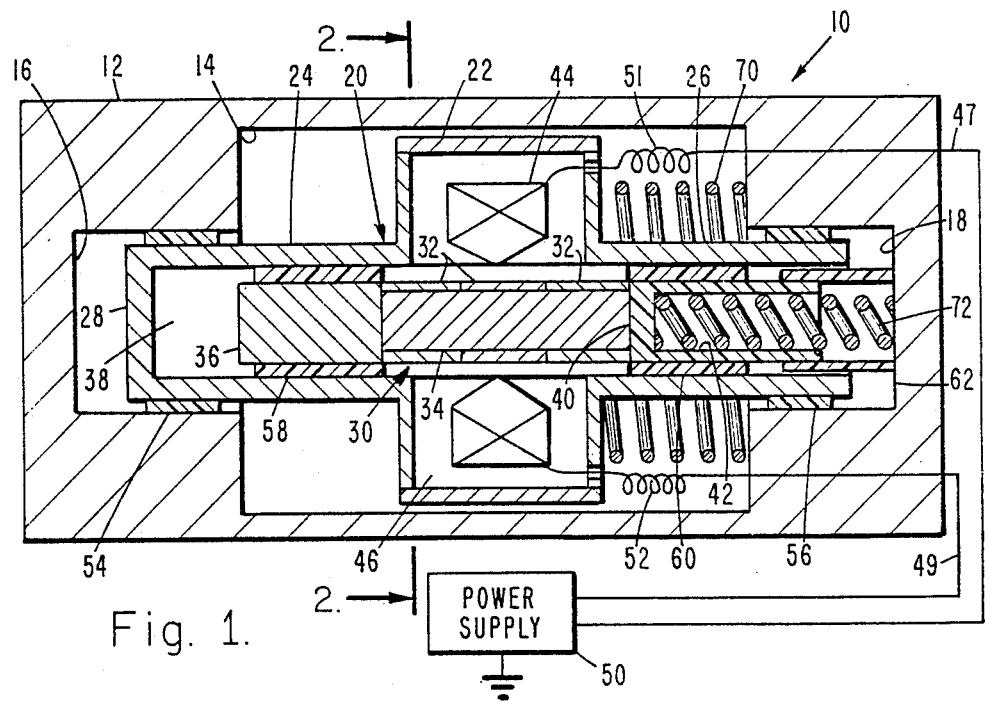
FIG. 1 is a longitudinal sectional view, partly in schematic form, illustrating a linear motor arrangement in accordance with the invention.

Referring to FIG. 1 with greater particularity, a linear motor arrangement 10 according to the invention may be seen to include a housing 12 which may be of aluminum, for example, and which defines an enlarged cylindrical chamber 14 with coaxially smaller-diameter extensions 16 and 18 at both ends. Coaxially disposed within the housing 12 for reciprocating linear movement therein is a motor housing 20 which may be of stainless steel, for example, having an enlarged annular central portion 22 and coaxial smaller diameter tubular portions 24 and 26 extending longitudinally from the respective ends of the central portion 22. The tubular portions 24 and 26 extend into the respective chamber extensions 16 and 18 such that a small annular gap exists between the outer circumferential surface of the tubular portion 24 or 26 and the adjacent cylindrical surface of the respective chamber extension 16 or 18. The outer end of the tubular portion 24 is closed by end portion 28, while the outer end of the tubular portion 26 remains open.

Figure 2:
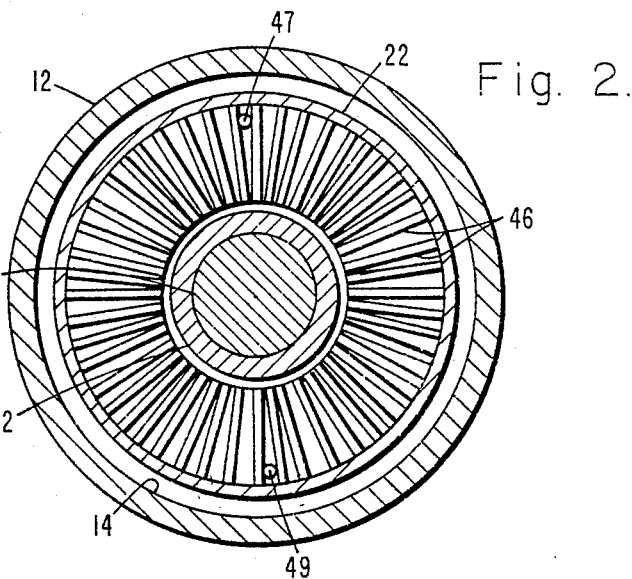
FIG. 2 is a cross-sectional view taken along line 2—2 of FIG. 1.

A cylindrical motor armature assembly 30 is coaxially disposed within the motor housing 20 and is adapted to move within the housing 20 in reciprocating linear fashion. It will be apparent that since the motor housing 20 within which the armature assembly 30 is disposed is moveable relative to the housing 12, the motor armature assembly 30 is also moveable relative to the housing 12. In the specific exemplary arrangement illustrated in FIGS. 1 and 2, the motor armature assembly 30 comprises a plurality (three are shown) of successive aligned annular magnets 32 coaxially disposed about a common cylindrical iron core 34. The magnets 32 preferably are magnetized in a radial direction with adjacent magnets being of opposite polarity. For example, if the end magnets have their respective north poles at their outer radial extremities and their respective south poles at their inner radial extremities, then the center magnet would have its south pole at its outer radial extremity and its north pole at its inner radial extremity.

Attached to one end of the armature core 34 and extending within motor housing tubular portion 24 is a cylindrical piston 36 of a nonmagnetic material having a low thermal coefficient of expansion such as titanium or a tungsten alloy, for example. In cryogenic refrigerator applications the space between the outer end of the piston 36 and the end portion 28 of the motor housing portion 24 functions as a compression volume 38 which contains a suitable working gas such as helium, for example. Well-known sliding valves or flexible gas transfer lines (not shown) may be employed to enable the working gas to enter and leave the compression space 38. It is pointed out that in lieu of a simple solid piston attached to the end of the motor armature core 34, various more elaborate piston arrangements alternatively may be employed to transfer the reciprocating linear motion of the motor armature assembly 30 to a gas compression space.

At the opposite end of the motor armature core 34 from the piston 36 there is attached a cylindrical member 40 which extends within the motor housing tubular portion 26. The member 40 may be of the same material as the piston 36 and may define a longitudinal cavity 42 extending axially within the member 40 from its outer end. Disposed within the cavity 42 is a balancing spring to be described in more detail below.

A motor winding 44 is coaxially mounted within the motor housing central portion 22 to carry an electric current for generating an axial magnetic field which causes the motor armature assembly 30 to move longitudinally back and forth within the motor housing 20. Secured about the winding 44 and extending radially between the outer and inner extremities of the housing portion 22 are a plurality of iron laminations 46. The laminations 46 provide a low magnetic reluctance path for the magnetic flux generated by the alternating current in the winding 44. The opposite ends of the winding 44 are connected via respective leads 47 and 49 to a suitable power supply 50. The leads 47 and 49 may contain coiled portions 51 and 52, respectively, within the chamber 14 to provide sufficient slack to enable the motor housing 20 which carries the winding 44 to move longitudinally within the housing 12 without placing undue strain on the leads 47 and 49.

In order to support the motor housing 20 in a manner enabling the housing 20 to reciprocate freely within the housing 12, the motor housing 20 is mounted on a pair of annular slider bearings 54 and 56 respectively disposed between a portion of the outer lateral surface of the motor housing portion 24 and the adjacent portion of the inner lateral surface of the chamber extension 16 and between a portion of the outer lateral surface of the motor housing portion 26 and the adjacent portion of the inner lateral surface of the chamber extension 18. The slider bearings 54 and 56 are preferably of a plastic material such as Rulon or Teflon and, as an example for illustrative purposes, may have a thickness of about 0.01 inch.

In order to support the motor armature assembly 30 within the motor housing 20 so as to enable the armature assembly 30 to reciprocate freely within the motor housing 20, the armature assembly 30 may be mounted on a pair of slider bearings 58 and 60 which may be similar to the slider bearings 54 and 56. Specifically, as shown in FIG. 1, slider bearing 58 may be disposed between a portion of the outer lateral surface of the piston 36 and the adjacent portion of the inner lateral surface of the motor housing portion 24, while slider bearing 60 may be disposed between a portion of the outer lateral surface of the member 40 and the adjacent portion of the inner lateral surface of the motor housing portion 26.

The slider bearings 54, 56, 58, and 60 enable the motor armature assembly 30 to move within the motor housing 20 and the motor housing 20 to move within the housing 12 with very little friction which in most instances will have a negligible effect on the vibration reduction arrangement of the invention. However, in the event friction between the motor housing 20 and the housing 12 provides sufficient force to give rise to a small residual vibration imbalance, compensating friction may be introduced between the housing 12 and the armature assembly 30. This may be achieved by attaching an annular slider bearing 62 of the same materials as the slider bearings 54, 56, 58 and 60 to the housing 12 at the end of the chamber extension 18 so that the outer lateral surface of the member 40 slides within the bearing 62 and generates the desired compensating friction.

As was mentioned above, a linear motor arrangement 10 according to the invention is designed so that essentially no vibration is transmitted to the housing 12. This is achieved by utilizing a center of mass balancing principle that the center of mass of the moving parts (namely, the armature assembly 30 and the motor housing 20 with the winding 44 and the laminations 46 mounted therein) will not move if these parts are suspended in free space. By attaching the motor housing 20 and the armature assembly 30 to the housing 12 with springs having appropriate spring constants, the motor housing 20 and the armature assembly 30 are effectively suspended in free space relative to the housing 12, and no net force is transmitted to the housing 12.

In the specific exemplary arrangement illustrated in FIG. 1, a motor housing spring 70 having a spring constant $K_m$ is coaxially disposed within the chamber 14 about the housing tubular portion 26 with one end attached to the adjacent radially extending surface of the motor housing central portion 22 and the other end attached to the housing 12. A motor armature spring 72 having a spring constant $K_a$ is coaxially disposed within the chamber extension 18 and the cavity 42 and has one end attached to the member 40 and the other end attached to the housing 12. The spring constants $K_m$ and $K_a$ are selected such that the ratio $K_m/K_a = M_m/M_a$, where $M_m$ is the mass of the motor housing 20 and the components secured therein including the winding 44 and the laminations 46, and $M_a$ is the mass of the armature assembly 30. For spiral wire springs such as are illustrated for the springs 70 and 72, the spring constant is determined by the spring material as well as by geometrical properties such as the wire diameter, the number of turns, and the diameter of the turns. Exemplary materials which may be employed for the springs 70 and 72 are beryllium copper, stainless steel, and where especially long life is desired, carbon steel. As a specific example for illustrative purposes, for a motor housing assembly mass $M_m$ of 1.0 pound and armature assembly mass $M_a$ of 0.5 pound, the spring constant $K_m$ may be 40 pounds per square inch and the spring constant $K_a$ 20 pounds per square inch. In addition to the effect provided by the springs 70 and 72, a spring effect is provided between the motor housing 20 and the armature assembly 30 by the gas within the volume 38 as it alternatively undergoes compression and expansion due to the linear reciprocating motion of the piston 36.

In the operation of a motor arrangement 10 according to the invention, the force $F_m$ applied to the housing 12 due to motion of the motor housing 20 is given by $F_m = K_m X_m$, wherein $X_m$ is the distance moved by the motor housing 20. Similarly, the force $F_a$ applied to the housing 12 due to motion of the armature assembly 30 is given by $F_a = K_a X_a$, where $X_a$ is the distance moved by the armature assembly 30. Since the motor housing 20 and the armature assembly 30 move by amounts inversely proportional to their respective masses, i.e., $X_a/X_m = M_m/M_a$, and since the spring constants $K_m$ and $K_a$ are selected in proportion to the ratio of the respective masses $M_m$ and $M_a$ as described above, the forces $F_m$ and $F_a$ match exactly, and no net force is transmitted to the housing 12.

It will be apparent from the foregoing that a linear motor balancing arrangement according to the invention is insensitive to the frequency of operation of the motor, and exceptional balance is achieved over a wide range of motor frequencies. Moreover, only a single motor is required, and a significant improvement in size, weight and efficiency is achieved over balancing schemes employing two motors. An arrangement according to the invention is also light in weight because the masses required for balance are low, and no additional weight is needed for a separate counterbalance. In addition, ample volume is available for housing internal electronics, and the winding and armature components of the motor remain aigned regardless of the orientation of the housing.

Although the present invention has been shown and described with reference to a particular embodiment, nevertheless various changes and modifications which are obvious to a person skilled in the art to which the invention pertains are deemed to lie within the spirit, scope, and contemplation of the invention.

What is claimed is:

1. A linear motor arrangement comprising:
   a housing;
   a motor winding assembly of mass $M_m$ disposed within said housing and adapted for reciprocating linear movement relative to said housing;
   a motor armature assembly of mass $M_a$ disposed within said housing adjacent to said motor armature assembly and adapted for reciprocating linear movement relative to said motor winding assembly and said housing;
   first spring means having a spring constant $K_m$ operatively disposed between said motor winding assembly and said housing;
   second spring means having a spring constant $K_a$ operatively disposed between said motor armature assembly and said housing;
   said spring constants $K_m$ and $K_a$ substantially satisfying the relation $K_m/K_a = M_m/M_a$; and
   means for providing a spring effect between said motor winding assembly and said motor armature assembly.

2. A linear motor arrangement according to claim 1 and further including a first pair of slider bearings disposed between and abutting said motor winding assembly and said housing, and a second pair of slider bearings disposed between and abutting said motor winding assembly and said motor armature assembly.

3. A linear motor arrangement according to claim 1 wherein said means for providing a spring effect is a variable volume of gas contained between said motor winding assembly and said motor armature assembly.

4. A linear motor arrangement comprising:
   a substantially cylindrical housing;
   a substantially tubular motor winding assembly of mass $M_m$ disposed within said housing and adapted for reciprocating linear movement within said housing;
   a substantially cylindrical motor armature assembly coaxially disposed within said motor winding assembly and adapted for reciprocating linear movement within said motor winding assembly;
   first spring means having a spring constant $K_m$ operatively disposed between said motor winding assembly and said housing;
   second spring means having a spring constant $K_a$ operatively disposed between said motor armature assembly and said housing;
   said spring constants $K_m$ and $K_a$ substantially satisfying the relation $K_m/K_a = M_m/M_a$; and
   means for providing a spring effect between said motor winding assembly and said motor armature assembly.

5. A linear motor arrangement according to claim 4 and further including a first pair of annular slider bearings disposed between and abutting respective outer lateral surface portions of said motor winding assembly and adjacent lateral surfaces of said housing, and a second pair of annular slider bearings disposed between and abutting respective outer lateral surface portions of said motor armature assembly and adjacent inner lateral surface portions of said motor winding assembly.

6. A linear motor arrangement according to claim 4 wherein said means for providing a spring effect is a variable volume of gas contained between said motor winding assembly and said motor armature assembly.

7. A linear motor arrangement according to claim 4 wherein said motor armature assembly includes a cylindrical iron core and a plurality of successive aligned annular magnets coaxially disposed about said core.

8. A linear motor arrangement according to claim 4 wherein said motor winding assembly has an enlarged annular central portion wherein a motor winding is contained and coaxial smaller-diameter tubular portions extending longitudinally from the respective ends of said central portion.

9. A linear motor arrangement according to claim 8 wherein said first spring means is a spiral spring coaxially disposed about one of said tubular portions and connected between a radially extending surface of said central portion and said housing.

10. A linear motor arrangement according to claim 8 wherein one of said tubular portions has an open end, and said second spring means is a spiral spring coaxially disposed within and extending through said open end.

11. A linear motor arrangement according to claim 10 wherein said motor armature assembly includes a substantially cylindrically-shaped member defining a longitudinal cavity extending therein from its outer end, and said second spring means extends into said cavity.

12. A linear motor arrangement according to claim 11 and further including an annular slider bearing attached to said housing and disposed about and abutting a portion of the outer lateral surface of said substantially cylindrically-shaped member.

13. A linear motor arrangement according to claim 8 wherein said motor armature assembly includes a piston at one end, one of said tubular portions has an end portion which in conjunction with a portion of the inner lateral surface of said one of said tubular portions and the end surface of said piston defines an enclosed space of variable volume, and a gas is contained within said enclosed space.

* * * * *